US009472220B1

(12) United States Patent
Burgos et al.

(10) Patent No.: US 9,472,220 B1
(45) Date of Patent: Oct. 18, 2016

(54) DUAL WAVEGUIDE NEAR FIELD TRANSDUCER FOR HEAT ASSISTED MAGNETIC RECORDING

(71) Applicant: HGST Netherlands B.V., Amsterdam (NL)

(72) Inventors: Stanley Burgos, Huntington Park, CA (US); Barry C. Stipe, San Jose, CA (US)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 14/850,845

(22) Filed: Sep. 10, 2015

(51) Int. Cl.
*G11B 5/02* (2006.01)
*G11B 21/08* (2006.01)
*G11B 5/48* (2006.01)
*G11B 5/00* (2006.01)

(52) U.S. Cl.
CPC ..... *G11B 5/4866* (2013.01); *G11B 2005/0021* (2013.01)

(58) Field of Classification Search
CPC .................. G11B 5/3903; G11B 2220/2525; G11B 2005/0021; G11B 5/314; G11B 11/0595; G11B 7/1384
USPC .......... 360/59, 313; 369/13.13, 13.33, 13.24, 369/13.11; 385/15
See application file for complete search history.

(56) References Cited

U.S. PATENT DOCUMENTS

| 8,649,245 | B2 | 2/2014 | Goulakov et al. |
| 8,917,581 | B1 | 12/2014 | Mallary |
| 2013/0108212 | A1* | 5/2013 | Peng ............. G02B 6/4215 385/15 |
| 2014/0099054 | A1 | 4/2014 | Black et al. |

OTHER PUBLICATIONS

Bhargava et al., "HAMR Thermal Reliability via Inverse Electromagnetic Design," The Magnetic Recording Conference, IEEE, Aug. 11-13, 2014, 12 pages.
Challener et al., "Near-Field Optics for Heat-Assisted Magnetic Recording (Experiment, Theory, and Modeling)," Modelling and Numerical Simulations II, Springer Science+Business Media LLC, Aug. 15, 2009, pp. 53-111.
Sendur, K., "Perpendicular oriented single-pole nano-optical transducer," Optical Society of America, vol. 18, No. 5, Mar. 1, 2010, pp. 4920-4930.

* cited by examiner

*Primary Examiner* — Nabil Hindi
(74) *Attorney, Agent, or Firm* — Zilka-Kotab, PC (57) ABSTRACT

A near field transducer (NFT) for heat assisted magnetic recording (HAMR) having a dual waveguide excitation system located adjacent to opposite sides of a plasmonic antenna. The light to one of the waveguides can be passed through a phase shifter so that its electric field is 180 degrees out of phase with that of the other waveguide. In this way, the energy from each of the waveguides can be delivered to the plasmonic antenna in an additive manner while heat-sinking schemes can be implemented in the orthogonal direction for greatly improving the optical efficiency and thermal stability of the NFT.

20 Claims, 6 Drawing Sheets

DUAL WAVEGUIDE NEAR FIELD TRANSDUCER FOR HEAT ASSISTED MAGNETIC RECORDING

FIELD OF THE INVENTION

The present invention relates to magnetic data recording, and specifically to a magnetic write head having a near field transducer that is excited by two phase-shifted optical waveguides.

BACKGROUND

Modern day information is commonly stored in magnetic disk drives that include a rotating magnetic disk and a slider containing one or more magnetic head assemblies that house read and write heads that are suspended over the disk by a swinging suspension arm. When the disk rotates, air flows underneath the slider and causes it to lift off and 'fly' over the surface of the rotating disk, allowing for the magnetic heads to be employed via processing circuitry to read/write magnetic impressions from the rotating disk.

The write head includes at least one coil, a write pole, and one or more return poles. When current flows through the coil, it induces a magnetic field that emanates from the write pole into the disk. The magnetic field is sufficiently strong that it locally magnetizes a portion of the magnetic media, thus allowing for data bits to be recorded onto the disk. After passing through the magnetic layer, the magnetic field travels through the rest of the disk and completes its path by returning to the return pole of the write head.

Once a data bit is recorded onto the disk, its magnetic state can be read with a magnetoresistive sensor, such as giant magnetoresistive (GMR) or a tunnel junction magnetoresistive (TMR) sensor, that has a measurable electrical resistance that changes in response to the magnetic field state of the recorded data bit.

This read/write method is the recording technique typically implemented in conventional perpendicular magnetic recording (PMR). However, as data density needs increase and data bits are made smaller and packed closer together, they become thermally unstable and prone to demagnetization. One way to circumvent this problem is to make the recording media more magnetically stiff, i.e. have a higher magnetic anisotropy. However, 'stiffer' media also requires higher recording magnetic fields, something which is in itself a limitation since in order to record smaller data bits, the pole size also needs to be reduced, and this in turn reduces the strength of the magnetic field that can be delivered to the disk.

A solution to this challenge is to use heat assisted magnetic recording (HAMR) in which data bits are defined by locally heating the media through the use of a near field transducer (NFT) just at the location on the disk that is to be recorded. The heating process temporarily lowers the magnetic anisotropy of the media, thus 'softening' it and allowing it to be recorded with the pole write fields that would otherwise be too weak to induce magnetization. Then, after the data has been written, as the disk spins past the NFT, the media cools, causing the anisotropy of the media to rise again, thereby ensuring that the media 'freezes in' the magnetic state of the recorded data bit.

SUMMARY

The present invention presents a near field transducer (NFT) for use in heat assisted magnetic recording (HAMR) that includes a plasmonic antenna that is excited by two optically phase shifted waveguides. In one embodiment, the write head may be formed on a slider that has a light source such as a laser mounted onto its backside surface. Light from the laser can be coupled to the head and passed through a splitter where it can be split into two optical channels, such as waveguides. One of these waveguides can be passed through an optical phase shifter, which can be as simple as a relative path-length difference between the two waveguides. By appropriately tuning the phase shifter, the light in the two waveguides can be set to be 180 degrees (or $\pi$ radians) out of phase. The two waveguides can then deliver phase shifted light to the NFT, exciting a symmetric surface plasmon distribution on the NFT that constructively interferes as it is focused and delivered to the media for use in heat assisted magnetic recording.

These and other features and advantages of the invention will become apparent upon reading of the following detailed description of the embodiments taken in conjunction with the figures in which consistent reference numbering is used to indicate similar elements throughout.

BRIEF DESCRIPTION OF THE DRAWINGS

For a fuller understanding of the nature and advantages of this invention, as well as to illustrate the preferred mode of use, reference should be made to the following detailed description, read in conjunction with the accompanying drawings, which for clarity are not drawn to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
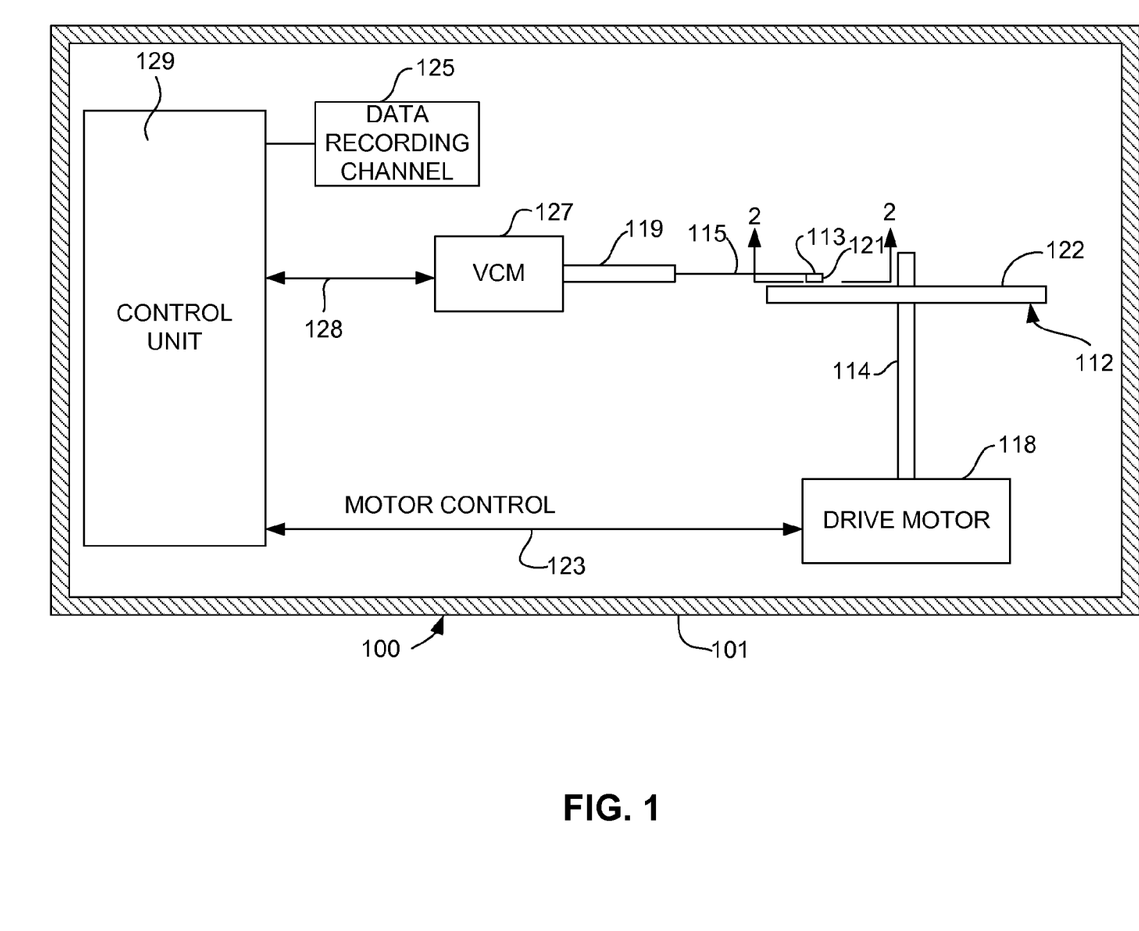
FIG. 1 is a schematic illustration of a disk drive system in which the invention might be embodied.

FIG. 1 shows a disk drive 100 along with its housing 101 containing at least one rotatable magnetic disk 112 that is supported on a spindle 114 and rotated by a disk drive motor 118. The magnetic recording pattern on each disk 112 may be in the form of annular patterns of concentric data tracks (not shown).

At least one slider 113 is positioned near the magnetic disk 112, with each slider 113 supporting one or more magnetic head assemblies 121. As the magnetic disk rotates, the slider 113 moves in and out over the disk surface 122 so that the head assembly 121 can access different tracks on the disk. Each slider 113 is attached to an actuator arm 119 by way of a suspension 115. The suspension 115 provides a slight spring force, which biases the slider 113 against the disk surface 122. Each actuator arm 119 is attached to an actuator means 127, which may be a voice coil motor (VCM) comprised of a coil that is movable according to a magnetic field. The direction and speed of the coil movement is controlled by the motor current signals supplied by the controller 129.

During operation of the disk storage system, the rotation of the magnetic disk 112 generates an air bearing between the slider 113 and the disk surface 122, which exerts an upward force, or lift, on the slider. The air bearing thus counter-balances the slight spring force of the suspension 115 and supports the slider 113 off and slightly above the disk surface by a small, substantially constant spacing during normal operation conditions.

The various components of the disk storage system are controlled by access control and internal clock signals that are generated by a control unit 129, typically comprised of logic control circuits and a microprocessor. The control unit 129 generates control signals to control various system operations such as drive motor control signals on line 123 and head position and seek control signals on line 128. The control signals on line 128 move and position the slider 113 to the desired data track on the media 112. Write and read signals are communicated to and from the write and read heads 121 by way of a recording channel 125.

Figure 2:
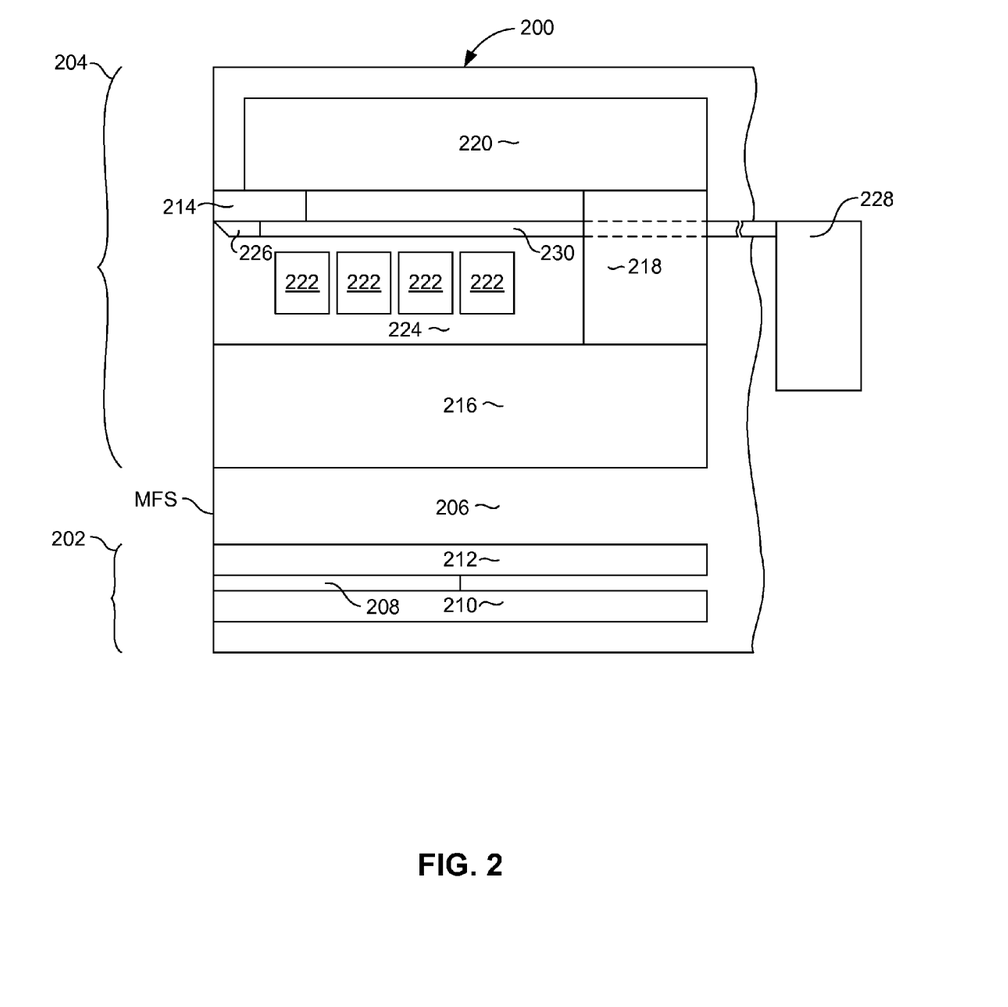
FIG. 2 is a schematic, cross-sectional side view of a sample magnetic read/write head used for heat assisted magnetic recording.

FIG. 2 shows a cross sectional side view of a sample magnetic read/write head 200 that incorporates a near field transducer for use in heat assisted magnetic recording. The read/write head 200 includes a magnetic read element 202 and a magnetic write element 204, both of which can be embedded in an insulating fill material 206 such as alumina. The read element includes a magnetoresistive sensor 208 that can be placed in between a first and second magnetic shield 210, 212.

The write element 204 includes a magnetic write pole 214, and a magnetic return pole 216, both of which extend out to the media facing surface (MFS) of the head. The write pole 214 is connected to a main pole structure 220 that connects to the return pole 216 via a back gap structure 218.

An electrically conductive, non-magnetic write coil 222, shown in cross section in FIG. 2, passes through the write element 204. The write coil 222 can be constructed of a material such as Cu. The write coil can be embedded in a non-magnetic, electrically insulating layer 224 such as alumina. When an electrical current passes through the write coil 222, a magnetic field is generated that is delivered to the disk via the write pole 214. In conventional perpendicular magnetic recording (PMR), this magnetic field is strong enough to magnetize the media, thus allowing recording to occur. The magnetic field then flows through the rest of the disk, and completes its path by returning to the return pole 216. Because the return pole 216 has a much larger area at the MFS than the write pole 214, the returning magnetic field strength is sufficiently weak that it does not erase any previously recorded data on the disk.

However, as data density needs increase, the size of the write pole is decreased and data bits are made smaller and packed closer together until they become thermally unstable and prone to demagnetization. One way to circumvent this problem is to construct the magnetic media of a higher anisotropy magnetic material. However, while this makes the magnetic media more stable, it also causes it to require higher recording magnetic write fields, a problem that is exacerbated by the fact that smaller write poles output a weaker magnetic field, thus making it difficult for recording to occur.

This challenge can be overcome by the use of heat assisted magnetic recording (HAMR) in which highly anisotropic magnetic media is locally heated to temporarily lower its anisotropy, thus allowing for magnetic recording to occur. Then, as the disk moves past the hotspot, the media cools, and its anisotropy again increases, thus ensuring the magnetic stability of the recorded data on the disk.

To this end, the magnetic write element 204 can include a near field transducer (NFT) 226 that extends to the media facing surface (MFS) at a location adjacent to the leading edge of the write pole 214. The near field transducer is optically connected with a light source, such as a laser 228 that can be located at the backside of the slider on which the magnetic head 200 is formed. The light from the laser 228 can be delivered to the near field transducer via the use of an optical waveguide element 230.

Figure 3:
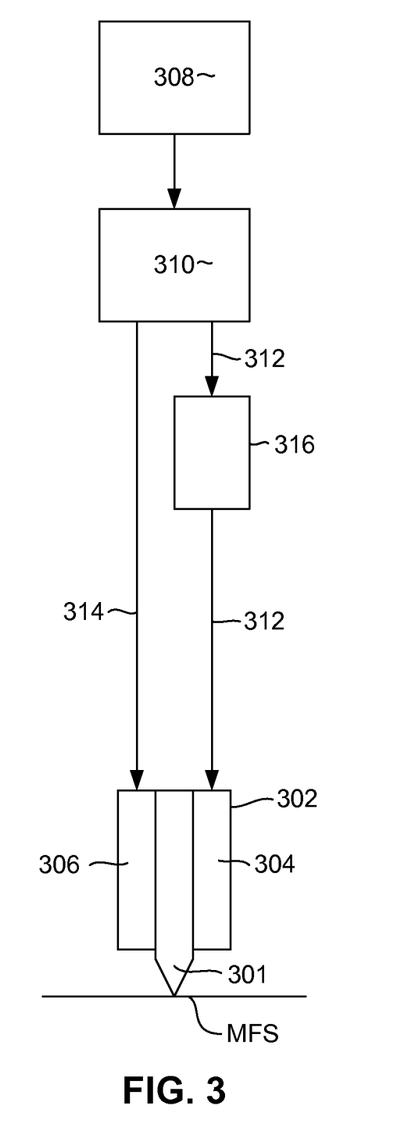
FIG. 3 is a schematic front view of the disclosed near field transducer having two optically phase shifted waveguides and associated components according to an embodiment.

FIG. 3 schematically illustrates an embodiment of the near field transducer disclosed herein. The NFT 302 is located at the MFS of the magnetic head and includes a plasmonic antenna 301 that is positioned in between two waveguides 304, 306 that serve to deliver phase shifted light to the antenna. The light delivery process is as follows: a laser light source 308 first delivers light to a splitter 310 that splits the light into two optical channels 312, 314, such as waveguides. The light from one of the waveguides (e.g. 312) is then passed through a phase shifter shown schematically as element 316. Although the phase shifting is shown as being performed by schematic element 316, in reality the phase shifter 316 can simply comprise a relative path-length difference between the two waveguides, that causes the light in that waveguide 312 to be shifted 180 degrees (or $\pi$ radians) relative to the light in the other waveguide 314. Light from the two optically phase shifted waveguides 312, 314 can then be coupled to, or simply continued to, the waveguides positioned on either sides of the NFT 304, 306. The light from these waveguides 304, 306 is then evanescently coupled to the plasmonic antenna 301 such that they excite charge symmetric surface plasmon modes on opposite sides of the antenna 301. The plasmonic antenna has a shape that constructively focuses this energy to a very small spot at the MFS of the NFT, allowing it to be delivered to the media for use in heat assisted magnetic recording.

Figure 4:
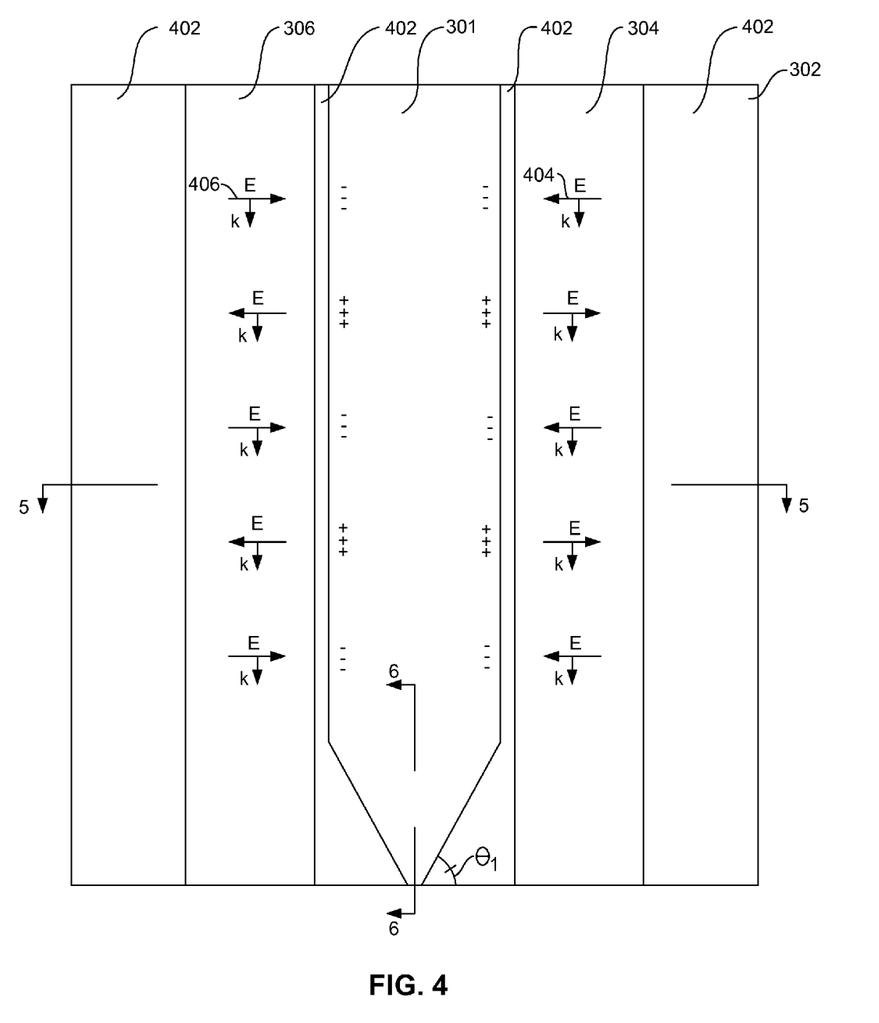
FIG. 4 is an enlarged view of the disclosed near field transducer having two optically phase shifted waveguides.

The operation of this phase shifted dual waveguide NFT excitation scheme can be better understood with reference to FIG. 4, which shows an enlarged view of the disclosed NFT 302. For reference, the plasmonic antenna 301 can be constructed of highly electrically conductive material such as Au and the two waveguides 304, 306 can each be constructed of a high refractive index material such as $Ta_2O_5$ that is encapsulated by a lower refractive index cladding material 402 such as $SiO_2$. In FIG. 4, the main component of the electric field (denoted by E) is shown, as well as the direction of energy flow (denoted by k) inside each of the waveguides 304, 306. As can be seen, due to the 180-degree phase shift between the two waveguides 304, 306, the electric field distribution is symmetric down the center of the NFT. For example, arrow 404, representing the electric field direction in waveguide 304, is oriented to the left, while arrow 406, representing the electric field direction in waveguide 306 is oriented to the right. As can be seen, this 180-degree phase shifted light delivery system excites a charge symmetric surface plasmon distribution on the antenna 301, as is represented by the plus (+) and minus (−) signs along the length of the antenna, that constructively interferes as it is focused down to a very small spot by the pointed shape of the antenna at the MFS.

If the light delivery waveguides 304, 306 were to be in-phase, i.e. without the 180-degree relative phase shift, the resulting electric fields in the waveguides would excite a charge antisymmetric plasmonic distribution at either sides of the plasmonic antenna 301 that would destructively interfere at the tapered portion of the NFT. This would cause there to be little or no energy delivered to the magnetic media for heating.

As can be seen in FIG. 4, the plasmonic antenna 301 tapers down as it reaches the air bearing surface, such that each of the sides defines an angle $\theta_1$ with respect to the MFS. The sharper the point is (or larger the angle $\theta_1$) the more efficient the plasmonic antenna will be at delivering the maximum amount of energy to the magnetic media. However, as a practical matter, increasing the sharpness of the point (increasing $\theta_1$) will also increase the amount of self-heating in the antenna as this will limit the solid angle through which the antenna can dissipate heat. Therefore, the angle $\theta_1$ must be chosen to strike a balance between delivering the maximum amount of energy to the media while minimizing the amount of heat-induced damage to the plasmonic antenna. To this end, the optimal range for angle $\theta_1$ is ~60-80 degrees.

Figure 5:
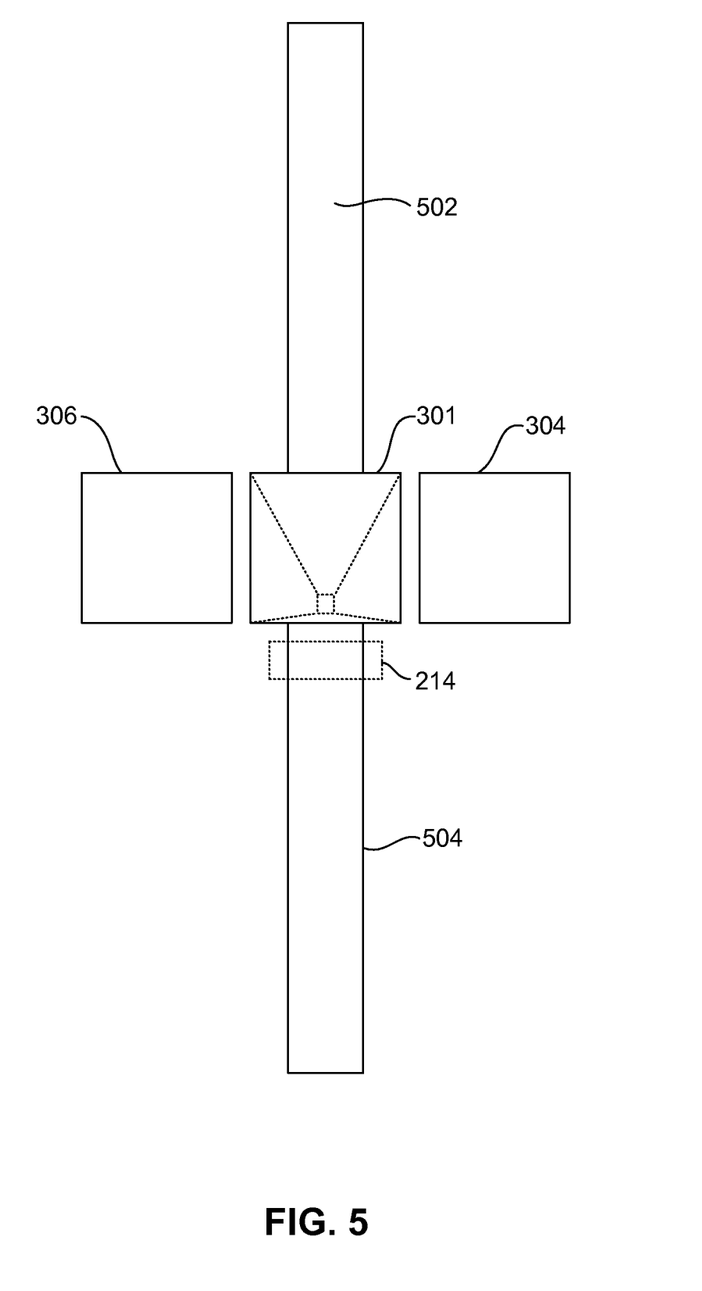
FIG. 5 is a view of the disclosed near field transducer taken from a plane that is parallel with a media facing surface.

FIG. 5 shows a cross sectional view of the NFT together with a heat sinking scheme as seen from line 5-5 in FIG. 4. In this figure, the plasmonic antenna's MFS physical footprint is illustrated by the small dashed line square drawn inside of the plasmonic antenna 301. Similarly, the location of the leading edge of the write pole 214 is illustrated by the dashed line rectangle positioned below the plasmonic antenna 301. From FIG. 5, it can be seen that the heat sinking structures 502, 504, which can be formed of a highly thermally conductive material such as Au, can be extended from the plasmonic antenna 301 in a direction that is orthogonal to the position of the excitation waveguides 304, 306. This unique combination of having the excitation waveguides positioned orthogonal to the heat sinking structures allows for an NFT design that is both optically efficient and thermally stable.

Figure 6:
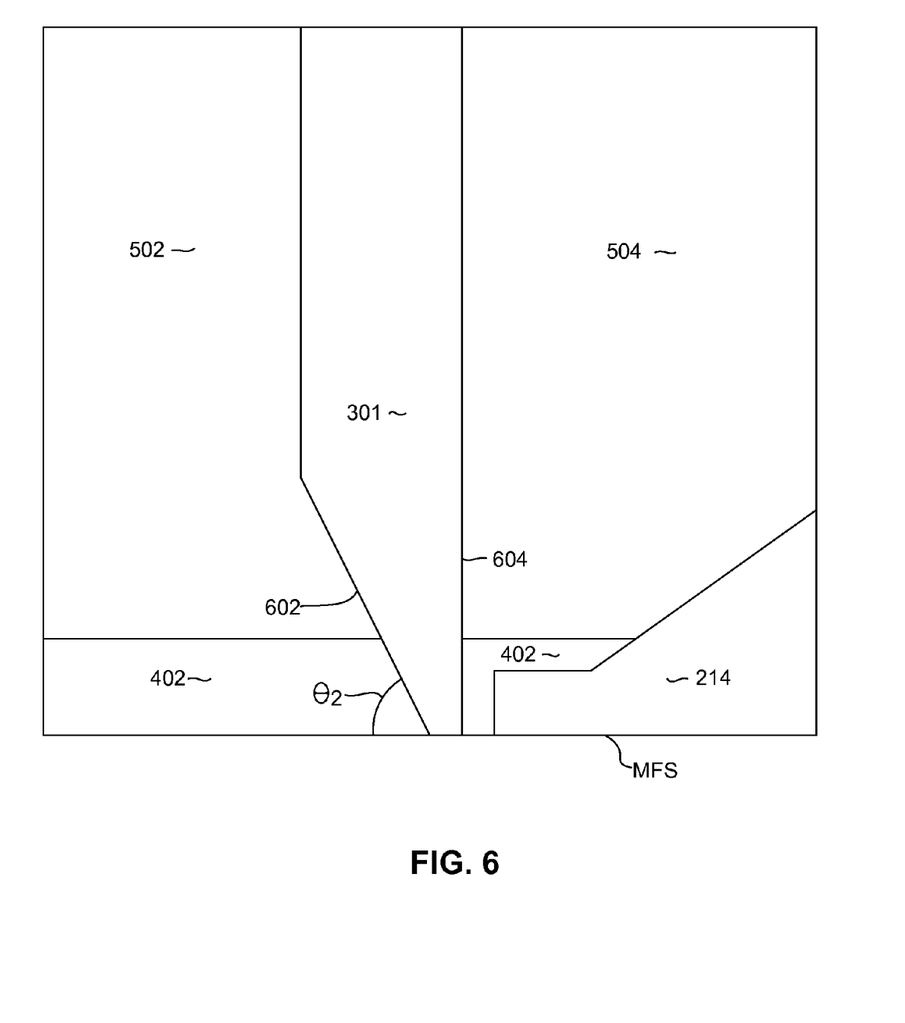
FIG. 6 is a cross-sectional side view of the disclosed near field transducer along a plane that is perpendicular to the media facing surface and parallel with the data track direction.

FIG. 6 shows a cross-sectional side view of the NFT as seen from line 6-6 in FIG. 4. As can be seen from this view, the plasmonic antenna 301 has an asymmetric pointed tip profile composed of a tapered portion 602 at one side (preferably at the leading edge) and a straight portion 604 at the other (preferably at the trailing edge). For the reasons discussed above with regard to FIG. 4, the angle of the tapered edge 602 must be adjusted to strike a balance between optical efficiency and thermal reliability of the NFT. To this end the tapered portion 602 is preferably formed at an angle $\theta_2$ that is ~55-65 degrees relative to the MFS.

While various embodiments have been described above, it should be understood that they have been presented by way of example only and are not meant to limit the inventive concepts claimed herein. Other embodiments falling within the breath and scope of the invention may also become apparent to those skilled in the art and thus, the breadth and scope of the invention should not be limited by any of the aforementioned exemplary embodiments, but should be defined only in accordance with the following claims and their equivalents.

What is claimed is:

1. A near field transducer, comprising:
   a plasmonic antenna having first and second opposite sides;
   a first waveguide located adjacent to the first side;
   a second waveguide located adjacent to the second side; and
   a phase shifter, configured to shift an optical phase of the first waveguide relative to the second waveguide.

2. The near field transducer as in claim 1, further comprising a light source, and a splitter, optically connected with the light source to split light from the light source into two light channels one of which passes to the phase shifter.

3. The near field transducer as in claim 1, wherein the phase shifter is configured to cause light delivered to the first waveguide to be $\pi$ radians out of phase with light delivered to the second waveguide.

4. The near field transducer as in claim 1, further comprising heat sink structures connected with the plasmonic antenna.

5. The near field transducer as in claim 1, wherein the phase shifter comprises a relative path-length difference between the first and second waveguides.

6. The near field transducer as in claim 1, wherein the plasmonic antenna has a leading edge that forms an angle of 55-65 degrees relative to a media facing surface.

7. The near field transducer as in claim 1, wherein the plasmonic antenna has a leading edge that forms an angle of 55-65 degrees relative to a media facing surface and a trailing edge that forms an angle of about 90 degrees relative to the media facing surface.

8. The near field transducer as in claim 1, wherein the plasmonic antenna has a leading edge that forms an angle of about 63 degrees relative to the media facing surface.

9. The near field transducer as in claim 1, wherein the plasmonic antenna has a leading edge and a trailing edge and wherein the first and second sides each extend from the leading edge to the trailing edge, and wherein a portion of each of the first and second sides defines an angle of 60-80 degrees relative to the media facing surface.

10. The near field transducer as in claim 1, wherein the plasmonic antenna has a leading edge and a trailing edge and wherein the first and second sides each extend from the leading edge to the trailing edge, and wherein a portion of each of the first and second sides defines an angle of about 70 degrees relative to the media facing surface.

11. A magnetic write head, comprising:
    a magnetic write pole;
    a light source; and
    a near field transducer located adjacent to the magnetic write pole and optically connected with the light source, the near field transducer further comprising;
    a plasmonic antenna having first and second opposite sides;
    a first waveguide located adjacent to the first side;
    a second waveguide located adjacent to the second side; and
    a phase shifter configured to shift an optical phase of the first waveguide relative to the second waveguide.

12. The magnetic write head as in claim 11, further comprising a splitter, optically connected with the light source to split light from the light source into two light channels prior to passing to the phase shifter.

13. The magnetic write head as in claim 11, wherein the phase shifter is configured to cause light delivered to the first waveguide to be $\pi$ radians out of phase with light delivered to the second waveguide.

14. The magnetic write head as in claim 11, further comprising heat sink structures connected with the plasmonic antenna.

15. The magnetic write head as in claim 11, wherein the phase shifter comprises a relative path-length difference between the first and second waveguides.

16. A magnetic data recording system, comprising:
a housing;
an actuator mounted within the housing;
a slider connected with the actuator for movement adjacent to a surface of a magnetic media; and
a magnetic write head formed on the slider, the magnetic write head, comprising:
a magnetic write pole;
a light source; and
a near field transducer located adjacent to the magnetic write pole and optically connected with the light source, the near field transducer further comprising;
a plasmonic antenna having first and second opposite sides;
a first waveguide located adjacent to the first side;
a second waveguide located adjacent to the second side; and
a phase shifter, configured to shift an optical phase of the first waveguide relative to the second waveguide.

17. The magnetic data recording system as in claim 16, further comprising a splitter, optically connected with the light source to split light from the light source into two light channels prior to passing to the phase shifter.

18. The magnetic data recording system as in claim 16, wherein the phase shifter is configured to cause light delivered to the first waveguide to be $\pi$ radians out of phase with light delivered to the second waveguide.

19. The magnetic data recording system as in claim 16, further comprising heat sink structures connected with the plasmonic antenna.

20. The magnetic data recording system as in claim 16, wherein the phase shifter comprises a relative path-length difference between the first and second waveguides.

* * * * *